(12) United States Patent
Ryan

(10) Patent No.: US 9,680,655 B2
(45) Date of Patent: Jun. 13, 2017

(54) PUBLIC-KEY CERTIFICATE MANAGEMENT SYSTEM AND METHOD

(71) Applicant: CloudTomo Limited, Edinburgh (GB)

(72) Inventor: Mark Ryan, Birmingham (GB)

(73) Assignee: CloudTomo Limited, Edinburgh (GB)

( * ) Notice: Subject to any disclaimer, the term of this patent is extended or adjusted under 35 U.S.C. 154(b) by 379 days.

(21) Appl. No.: 14/226,524

(22) Filed: Mar. 26, 2014

(65) Prior Publication Data

US 2014/0298010 A1    Oct. 2, 2014

(30) Foreign Application Priority Data

Mar. 26, 2013 (GB) .................................. 1305482.0

(51) Int. Cl.
| | | |
|---|---|---|
| H04L 9/32 | (2006.01) | |
| H04L 29/06 | (2006.01) | |
| G06F 21/33 | (2013.01) | |
| G06F 21/45 | (2013.01) | |

(52) U.S. Cl.
CPC ............ H04L 9/3268 (2013.01); G06F 21/33 (2013.01); G06F 21/45 (2013.01); H04L 9/3265 (2013.01); H04L 63/0823 (2013.01)

(58) Field of Classification Search
None
See application file for complete search history.

(56) References Cited

U.S. PATENT DOCUMENTS

| | | | |
|---|---|---|---|
| 4,309,569 A | 1/1982 | Markle | |
| 6,839,879 B1 * | 1/2005 | Hwang | ............. G06F 17/30011 707/999.007 |
| 6,981,151 B1 * | 12/2005 | Groeneveld | ............ G06F 21/64 713/175 |
| 7,634,496 B1 | 12/2009 | Evans | |
| 2008/0275891 A1 | 11/2008 | Park et al. | |

OTHER PUBLICATIONS

Laurie et al "Certificate Transparency" Mar. 14, 2014, pp. 1-33.
Naor et al "Certificate Revocation and Certificate Update," USENIX 1998, pp. 1-13.
Ryan "Enhanced Certificate Transparency and End-to-End Encrypted Mail," International Association for Cryptologic research Dec. 16, 2013, pp. 1-14.
EPO Search Report, Application No. EP14161377, dated Dec. 19, 2014.
Muhammad Nadzri Jamaluddin, MD Zaini Jamaludin, Norashidah MD Din and Noor Haizad Mohd Said, Date Time Stamping With Digital Signature Infrastructure, 2002 Student Conference on Research and Development Proceedings, Shah Alam, Malaysia 0-7803-7565-3/02, 2002 IEEE.
Ben Laurie and Emilia Kasper, Revocation Transparency.

* cited by examiner

*Primary Examiner* — Azizul Choudhury
(74) *Attorney, Agent, or Firm* — Lodestone Legal Group; Jeromye V. Sartain

(57) ABSTRACT

Methods and systems for public-key certificate management comprise storing digital certificates in data structures that allow the manager to provide a verifiable proof about the validity status of a certificate. The certificates are stored in two data structures in a database. One data structure stores items in chronological order and is queried to establish a proof that a later snapshot of the database is an extension of an earlier snapshot of the database. Another data structure is ordered by user identifier and is queried to establish a proof that a given digital certificate is currently valid.

17 Claims, 2 Drawing Sheets

PUBLIC-KEY CERTIFICATE MANAGEMENT SYSTEM AND METHOD

RELATED APPLICATIONS

This application claims priority and is entitled to the filing date of United Kingdom Patent Application GB 1305482.0 filed on Mar. 26, 2013, entitled "Improvements in or relating to Public-Key Certificate Management." The contents of the aforementioned application are incorporated by reference herein.

INCORPORATION BY REFERENCE

Applicant(s) hereby incorporate herein by reference any and all patents and published patent applications cited or referred to in this application.

BACKGROUND OF THE INVENTION

Field of the Invention

Aspects of this invention relate generally to public key cryptography, and more particularly to a method for authenticating a digital certificate and corresponding system, apparatus and computer program products.

Description of Related Art

Public-key cryptography is a well-known technique for securing electronic communications. Each user holds a private key and a public key, which are related to each other. The public key is used for encryption of data and is freely shared, while the private key is used for decryption and is not shared. When one entity wishes to send data to a recipient entity, they can encrypt the data with the recipient's public key, so that only the recipient can decrypt it upon receipt, using their private key.

Public-key cryptography relies on entities being able to obtain authentic copies of other entities' public keys. For example, suppose a user wishes to login to their bank account through their web browser. If the user's web browser uses the wrong public key for the bank, then the traffic (including log-in credentials) can be intercepted and manipulated by an attacker.

One way to provide assurance to one entity about the public key of another entity is via a Certificate Authority (CA). In the example given, the browser is presented with a public key certificate for the bank, which is intended to be unforgeable evidence that the given public key is the correct one for the bank. The certificate is digitally signed by a CA. The browser is pre-configured to accept certificates from certain known CAs. A typical installation of Firefox has about 100 CAs in its database.

CAs must be assumed to be honest. If a CA is dishonest, it may issue certificates asserting the authenticity of fake keys; they could be keys created by an attacker or by the CA itself. Unfortunately, the assumption of honesty does not scale up very well. A user has hundreds of CAs registered in their browser, and cannot be expected to have evaluated the trustworthiness of all of them. This fact has been exploited by attackers. If an attacker manages to insert a malicious CA into the user's browser, the attacker can get the browser to accept fake keys for standard services (such as bank web sites and webmail sites). Then the attacker can intercept and manipulate the user's traffic with those sites. Inserting a malicious CA can be done in a number of ways, such as: shipping malicious software, and social engineering attacks.

There is therefore a need for proving the authenticity of public keys in a way that cannot be compromised by a dishonest CA.

For some applications, providing authentication of public keys via a CA is not realistic. For example, the Pretty Good Privacy (PGP) encryption standard is used for e-mails and is targeted at individual e-mail users rather than corporate users. In that context, there are no entities that naturally fulfil the requirements to function as a CA, and so authentication of public keys is achieved on the basis of a peer-to-peer web of trust. The certifying role is spread amongst a set of users, each of whom are somewhat trusted and somewhat known to the sender and receiver with the expectation that, taken together, this comprises enough evidence of the authenticity of the public key.

However, e-mail encryption has not been widely adopted due to the burden that is placed on users. The model is either too complex or too time-consuming for the general public to understand and implement.

There is a need for proving the authenticity of public keys in a way that is "user-friendly"—in other words, can be provided in a form that users can adopt without needing to understand anything of how it works.

Aspects of the present invention fulfill these needs and provide further related advantages as described in the following summary.

SUMMARY OF THE INVENTION

Aspects of the present invention teach certain benefits in construction and use which give rise to the exemplary advantages described below.

According to a first aspect of the disclosure there is provided a method for authenticating a digital certificate comprising the steps of: providing a database of digital certificates wherein each of the digital certificates are stored using both a first data structure in which items are stored in chronological order and a second data structure which is ordered by certificate identifier; querying the first data structure to establish a proof that a later snapshot of the database is an extension of an earlier snapshot of the database; and querying the second data structure to establish a proof that a given digital certificate is currently valid.

The digital certificates may be stored in the first and second data structures, or the first and second data structures may comprise pointers to another database containing the certificates.

The digital certificates in the database may for example be those issued by a certificate authority (CA), or any other certificate issuing party.

The term "snapshot" simply means a copy or a representation of the database at a given point in time, either in whole or in part. The disclosure is not limited to any particular form of versioning technique for comparing these different versions of the database.

The step of querying the first data structure to establish a proof that a later snapshot of the database is an extension of an earlier snapshot of the database may comprise establishing a proof that the later snapshot is a properly formed extension of the earlier snapshot. The test for whether an extension is properly formed or not may involve checking that the difference between the earlier and later snapshots represents a modification of the earlier snapshot according to one or more required rules in order to arrive at the later snapshot.

Optionally, the first and/or second data structures comprise tree data structures.

Optionally, said first data structure is append-only, and said proof that a later snapshot of the database is an extension of an earlier snapshot of the database comprises a proof that the later snapshot is an append-only extension of the earlier snapshot.

Optionally, said first data structure is arranged such that proofs of chronological extension of the data structure can be furnished in a time of the order of the logarithm of its size.

Optionally, said first data structure comprises a Merkle tree.

Optionally, items in said first data structure are stored only at leaf nodes.

Optionally, the items stored in the first data structure comprise one or more pairs of a certificate identifier and a public key for that certificate.

Optionally, the second data structure is arranged such that proofs of a set of keys in the data structure corresponding to a given certificate identifier can be furnished in a time of the order of the logarithm of its size.

Optionally, said second data structure comprises a Merkle tree.

Optionally, said second data structure is organized as a binary search tree.

Optionally, the items stored in the second data structure comprise a certificate identifier together with a list of public keys associated with the certificate identifier.

Optionally, the items in the second structure are stored at leaf and non-leaf nodes.

Optionally, in the second data structure, a list of keys is stored for each certificate, of which only the last one is the current one, the others being revoked.

Optionally, the database may be updated by inserting a new digital certificate.

Optionally, the database may be updated by marking a certificate as revoked.

Optionally, the step of marking a certificate as revoked may comprise inserting a new key for a certificate.

Optionally, the new key may be a null key.

Optionally, the new key may be inserted as an extension to the first data structure, and as an addition to a list of keys associated with a certificate identifier in the second data structure.

Optionally, the method may comprise publishing a hash of the database. This may be made available on demand to any third party.

Optionally, the method comprises providing to a third party a proof that a later snapshot of the database is an extension of an earlier snapshot of the database; and/or a proof that a given digital certificate is currently valid.

The providing of a proof to a third party means the serving of the proof data in response to a request made by a software application or component. That software application or component may be activated intentionally by a user, or may be operated automatically in response to some other set of requests. In other words, the "third party" does not have to be a human, but can be a software application or component, or hardware device executing appropriate code.

Optionally, the step of providing a database of digital certificates is carried out by a certificate prover (CP) who is independent of a party who issues the digital certificates.

Optionally, the method comprises the step of verifying consistency between the data stored in the first and second data structures.

Optionally, the step of verifying consistency between the data stored in the first and second data structures is carried out by an auditor who is independent of users whose digital certificates are stored in the database, of the CP and of a party who issues the digital certificates.

Alternatively, the step of verifying consistency between the data stored in the first and second data structures may be carried out by a user whose digital certificates are stored in the database.

Optionally, the step of verifying consistency between the data stored in the first and second data structures may comprise querying a randomly chosen portion or portions of the data structures.

Optionally, a result of the consistency check and/or the proof that a later snapshot of the database is an extension of an earlier snapshot of the database and/or the proof that a given digital certificate is currently valid is represented as one or more graphical elements which are displayed to a user.

Optionally, the graphical elements are displayed by a browser application, for example as icons in a toolbar area.

Optionally, the graphical elements comprise a series of traffic light icons, which are selectively colored according to the status of the consistency check.

Optionally, the certificate identifier comprises an electronic messaging service address; and the steps of querying the first data structure to establish a proof that a later snapshot of the database is an extension of an earlier snapshot of the database and querying the second data structure to establish a proof that a given digital certificate is currently valid are performed by a message sender to authenticate a digital certificate of a message recipient before sending an electronic message encrypted with the recipient's public key.

Optionally, one or more pairs of users' public and symmetric keys are stored by a third party remotely from users' workstations, in an encrypted form. The third party may be the same party that provides a database of digital certificates.

Optionally, the electronic messaging service address is an e-mail address and the electronic message sent from a sender to a recipient is an e-mail.

Optionally, the message sender is provided with an e-mail client application that performs the steps of querying the first data structure to establish a proof that a later snapshot of the database is an extension of an earlier snapshot of the database and querying the second data structure to establish a proof that a given digital certificate is currently valid.

Optionally, the e-mail client application comprises a plug-in or an extension to an existing e-mail client application.

Optionally, the e-mail client application is provided as a web application.

Optionally, the stored messages can be accompanied by list of hashes of the words of the message.

Optionally, said list of hashes of the words of the message is lexicographically ordered.

Optionally, the logs and accompanying proofs comprise hashes of addresses.

Optionally, the method comprises the step of verifying consistency between the data stored in the first and second data structures.

Optionally, a result of the consistency check and/or the proof that a later snapshot of the database is an extension of an earlier snapshot of the database and/or the proof that a given digital certificate is currently valid is represented as one or more graphical elements and/or graphical effects which are displayed to a user.

Optionally, the graphical effects comprise selectively coloring an electronic messaging service address according to the status of the one or more of the consistency check, proof that a later snapshot of the database is an extension of an earlier snapshot of the database and proof that a given digital certificate is currently valid.

Optionally, the selective coloring applied to the electronic messaging service address comprises traffic light style color scheme.

According to a second aspect of the disclosure there is provided a system for authenticating a digital certificate comprising: a database of digital certificates wherein each of the digital certificates are stored using both a first data structure in which items are stored in chronological order and a second data structure which is ordered by certificate identifier; and executable functionality that queries said first data structure to establish a proof that a later snapshot of the database is an extension of an earlier snapshot of the database; and that queries the second data structure to establish a proof that a given digital certificate is currently valid.

The executable functionality may comprise a computer language functionality for manipulating or retrieving data such as structured query language (SQL) or other equivalents.

Optionally, the system also comprises executable functionality that inserts a new digital certificate into the database.

Optionally, the system also comprises executable functionality that marks a certificate as revoked.

Optionally, said database and said executable functionality that queries said database are hosted by a certificate prover (CP); who also provides an interface for third parties to request and receive the proof that a later snapshot of the database is an extension of an earlier snapshot of the database; and the proof that a given digital certificate is currently valid.

Optionally, said interface also enables third parties to insert or revoke digital certificates.

Optionally, said interface provides a hash of the database to any third party that requests it.

According to a third aspect of the present disclosure there is provided a computer program product comprising: a database comprising: a first data structure in which items are stored in chronological order; a second data structure which is ordered by user identifier; and executable functionality that queries said first data structure to establish a proof that a later snapshot of the database is an extension of an earlier snapshot of the database; and that queries the second data structure to establish a proof that a given datum is currently valid.

Optionally, said database is populated with certificates that are issued by a certificate authority (CA) wherein each of the digital certificates are stored in both the first data structure and the second data structure.

Optionally, the computer program product comprises executable functionality that inserts a new digital certificate into the database.

Optionally, the computer program product also comprises executable functionality that marks a certificate as revoked.

Optionally, the computer program product also comprises an interface third parties to request and receive said proofs that a later snapshot of the database is an extension of an earlier snapshot of the database and that a given digital certificate is currently valid; insert or revoke digital certificates; and receive a hash of the database.

Optionally, the computer program product is hosted by a certificate prover (CP) who is independent of a certificate authority (CA).

According to a fourth aspect of the present disclosure there is provided an electronic messaging client computer program product comprising: executable functionality that enables a user to register their username and public key with a database of digital certificates wherein each of the digital certificates are stored using both a first data structure in which items are stored in chronological order and a second data structure which is ordered by user identifier; and executable functionality that enables a user to authenticate the public key of an intended message recipient by querying said first data structure to establish a proof that a later snapshot of the database is an extension of an earlier snapshot of the database; and executable functionality that queries the second data structure to establish a proof that the intended recipient's public key is currently valid.

Optionally, said computer program product is a standalone application. Alternatively, it may be an extension to an e-mail client application, or a web application.

According to a fifth aspect of the disclosure there is provided a method for authenticating a digital certificate issued by a certificate authority (CA) by providing an objectively verifiable proof that a CA can be trusted concerning certificate issuance and certificate revocation.

Optionally, said step of providing an objectively verifiable proof comprises providing a log of certificates issued by the CA and providing proof that a later snapshot of the log is an extension of an earlier snapshot of the log; and that a given digital certificate is currently valid.

The computer program products of the third and fourth aspects may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
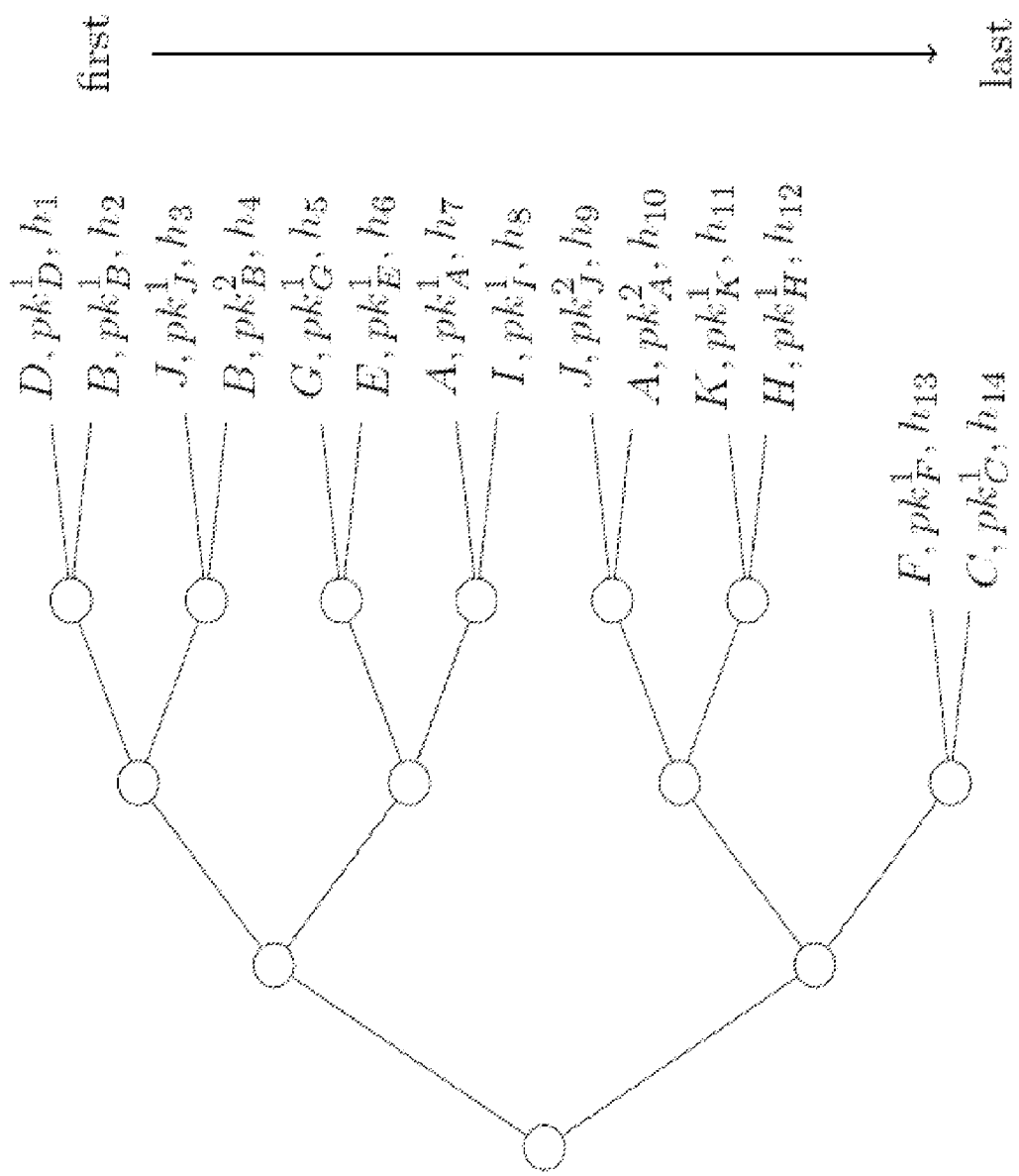
FIG. 1 shows a first data structure forming part of a certificate log database, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

A technique termed certificate transparency has been proposed by Google, that aims to prevent certificate authorities from issuing public key certificates for a domain without being visible to the owner of the domain. It is aimed at website certificates, and the technology is being built into Google's Chrome™ browser product.

The core idea is that a public log is maintained, showing all the certificates that have been issued. The log is append-only. Anyone can append a certificate to the log. Auditors can obtain two types of proof: (a) a proof that the log contains a given certificate, and (b) a proof that a snapshot of the log is an extension of another snapshot (i.e., only appends have taken place between the two snapshots).

In certificate transparency, one can prove that a certificate is in the log, but there is no notion of whether it is still current. Certificate transparency does not handle certificate revocation efficiently. Existing ideas to handle certificate revocation in this context include using a sparse Merkle Tree which stores the status of every possible certificate, but in which it is recognized that non-zero nodes are sparse, and so nodes that are known to lead to a zero leaf value need not be computed individually, so that a certificate can be shown to be unrevoked by following a path to the root in the Merkle tree. Another option is to list all the revoked certificates and sort them into order, and a tree is constructed where each leaf is a pair of consecutive entries from this sorted list. Non-revocation is shown by showing the pair in the tree that brackets the unrevoked certificate.

However both of these techniques for dealing with certificate revocation involve proofs that are of a size of the order (for example proportional to) the number of certificates being revoked. This means that the efficiency of computation is not practical, especially for larger scale systems.

Public key encryption can be used for e-mail. There are two main standards in use for public key encryption of e-mail, called Secure Multipurpose Internet Mail Extensions (S/MIME) and Pretty Good Privacy (PGP). They both require the user's client software to maintain the user's private key, and the public keys of the people she exchanges e-mail with.

The sender encrypts messages with the public key of the receiver. To do that, she needs to be sure to have an authentic copy of that public key. The receiver decrypts with his private key.

The sender signs messages with her private key. The receiver verifies the signature with the sender's public key. To do that, he needs to have an authentic copy of that public key.

The main conceptual difference between S/MIME and PGP is the way in which a user verifies that he has an authentic copy of another user's public key. Suppose Alice wants to send e-mail to Bob. She needs to know his public key. She can find it on a key server, or on his web page, or in an e-mail message he or someone else has sent to her, but these are non-authoritative sources. They could contain fake keys, generated by an attacker. If Alice encrypted the message with a fake key, then the attacker could decrypt her message. To solve this, the authenticity of public keys has to be certified, by one or more trusted parties. S/MIME and PGP differ about how this is done.

In S/MIME, public keys come with a certificate from a certificate authority (CA). The CA can be any entity, but it has to be trusted by both the sender and the receiver (if the CA issues a false certificate corresponding to its own private key, it is able to decrypt the mail). S/MIME works best in a large corporate environment, where the corporation can act as a CA for all its employees. It is natural for both employees and external users that correspond with employees to trust the corporation for e-mail related to its business. S/MIME works less well for small organizations, because they may not wish to take on the complexities of being a CA. Outsourcing the CA task is a possibility, but it relies on having to trust the outsourced CA. S/MIME hardly works at all for individuals, because they don't want to have to pay for a certificate and don't want to trust companies offering CA services.

A problem with CAs is that they have to be trusted by the sender and the receiver. This problem is made worse by the fact that there are typically multiple (perhaps hundreds) of CAs installed in e-mail browsers (and web browsers), and any CA can certify any key. That means that a single malicious CA can launch fake-key attacks on any e-mail address, not just the ones the user had in mind when it accepted to use that CA.

PGP is targeted at individual e-mail users rather than corporate users, and aims to avoid the requirement of "authorities" that certify public keys. This recognizes that, in the case of individuals, there are no entities that can fulfil the requirements of being a CA (namely: well-known, trusted by all users, and free to use). To solve this, PGP spreads the certifying role across a set of users, each of whom are somewhat trusted and somewhat known to the sender and receiver, with the expectation that, taken together, this comprises enough evidence of the authenticity of the public key. By signing each other's keys in a peer-to-peer fashion, PGP users create a "web of trust" that works not because of some highly trusted pillars like CAs, but because all the users support the trust web in a small way.

For example: Alice wants to send e-mail to Bob, so she needs to know his public key. She already has Charlie's public key, perhaps because he gave it to her physically when they met, and Charlie has signed a certificate for Bob's public key. That is some evidence, but not quite enough, because she doesn't know Charlie very well and is not sure if she can trust him ("trusting" Charlie means being assured not only that he has no malicious intent, but also that he is competent to judge whether the given key is Bob's). Fortunately, as well as Charlie, there is Dave, Eliza and Frederica. Alice has all their public keys already, and they have also signed Bob's key. Each one of them provides thus further evidence of the authenticity of that key. Putting that evidence together, Alice is assured that the given public key is Bob's.

In summary, PGP offers two ways to securely obtain a public key:
1. In person. Charlie gave to Alice unforgeable face-to-face evidence of the authenticity of his key. We assume that Alice uses normal means to identify Charlie (she may recognize him, or rely on his photo id, or whatever). To facilitate this direct way of exchanging public keys, PGP enthusiasts can organize "key signing parties".
2. From an unauthenticated source, but accompanied by signatures by people whose public key is already known and who are trusted. PGP includes mechanisms to quantify trust levels and to add together the trust from several key signers.

In spite of support on all major client software and significant efforts at supporting take-up, very few people use either S/MIME, PGP or indeed any other standard for encrypting their e-mail. Yet, there are substantial motivations, including compliance requirements as well as confidentiality requirements. End-to-end encrypted mail seems to have a dedicated following among a small number of people in very specific sectors. However, encrypted e-mail is not routinely used, for a number of reasons.

First of all, it is too complicated for users to understand the model. S/MIME is presented to users in a way that asks them to understand public and private keys, key servers, certificates, certificate authorities, etc. Even if mathematically capable enough, most users are not willing to invest the time and effort required to grasp these concepts. They feel that the pain outweighs the gain.

S/MIME assumes a hierarchical certificate-authority system for certifying keys which is expensive and cumbersome even for companies, and it appears to be prohibitive for SMEs and individuals. PGP is aimed more at individuals, having a peer-to-peer certifying arrangement, but this also has proved impossible for any but the most determined users to master.

Furthermore, even when set up on one platform (e.g., work desktop), the set-up has to be done again on other platforms (laptop, phone) and is different each time. Again, users have to copy keys around between devices, and the set-up is different in different contexts (desktop, mobile, webmail, etc.).

In short, it has proved impossible to "package" e-mail cryptography in a usable form that users can obtain the benefits without understanding how it works. This is in marked contract with cryptography on the web, which is used by billions of users every day.

The present disclosure presents a method which allows users of public keys to be able to rely on certificate authorities without having to trust them. To put this another way, the method allows CAs to prove to users that they have behaved correctly. This solves the core problem related to certificate authorities, namely, that some assumption has to be made that a CA is honest.

The method makes use of a data structure known as a Merkle tree, which may also be known as a hash tree. A Merkle tree is a tree in which every node is labelled with the hash of the labels of its children nodes, and possibly some other values. Suppose a node has children with hash values $v_1, \ldots, v_n$ and has data d. Then the hash value of the node is the hash of $v_1, \ldots, v_n, d$. Merkle trees allow efficient proofs that they contain certain data. Proving that a certain datum d is part of a Merkle tree requires an amount of data of the order of (for example, proportional to) the logarithm of the number of nodes of the tree. This contrasts with hash lists, where the amount is of the order of the number of nodes.

A public append-only log is maintained of the certificates issued by given certificate authority. The maintainer of the log can offer a proof that a certain certificate is current in the log, i.e., it has not been replaced or revoked. This is in contrast with certificate transparency, where proofs are that a certain certificate is present in the log, but not necessarily current.

A certificate prover (CP) is an entity that maintains a public log of certificates issued by a certificate authority. CP is able to issue proofs of monotonicity of the log(that is, that the log is only ever appended to), and proofs of currency of a given certificate. Suppose that CP's log consists of a collection of certificates:

db=[cert(Alice, $pk_{Alice}$), cert(Bob, $pk_{Bob}$), ... ]

Where "Alice" and "Bob" are examples of user identifiers, and $pk_{user}$ is the public key of a given user. The CP publishes a hash h(db) of the database to anyone who asks.

To demonstrate its correct behavior, CP must offer the following services:

| Input | Result |
| --- | --- |
| — | h(db): the hash of the current database. |
| (user, $pk_{user}$) | Insertion: the certificate cert(user, $pk_{user}$) is inserted into the database. |
| (user, $pk_{user}$) | Revocation: the certificate cert(user, $pk_{user}$) is marked as revoked by database. |
| h(db), h(db') | Monotonicity proof: a proof that db' is an append-only extension of db. We write this as db'⊑ db. |
| h(db), user | Currency proof: a proof that cert(user, $pk_{user}$) is current according to db. |

It is important that these operations are done efficiently. In order to achieve this, the disclosure stores the certificates in or using two data structures.

The first data structure is a Merkle tree in which items are stored in chronological order, and stored only at leaf nodes. Items are added chronologically, by extending the tree. As a short hand notation, this type of Merkle tree will be referred to herein as a "ChronTree".

The stored items may comprise pairs of a user identifier and a public key for that user. Revocation of a user's key may be recorded by adding a new key for the user, with the older key then being considered revoked. If a key was to be revoked without being replaced by a new one, then a null value can be added. Thus, a key for a user is considered current only if there is no later item for the user. Storing revocations in the same data structure as current certificates in this way represents a departure from existing methods.

The second data structure is a Merkle tree which is also organized as a binary search tree ordered by user identifier, such that a traversal of the tree yields the data in lexicographic order of user identifier. This data structure can be referred to as a "lexicographically ordered binary search Merkle tree", or as a more useful short hand notation, a "LexTree".

The stored items may comprise a user identifier together with a list of public keys associated with the user identifier: (user, $pk_{user,1}$, $pk_{user,2}$, ... ). These items are stored at leaf and non-leaf nodes such that a traversal yields the data in lexicographic order of user identifier (for example, e-mail address). A list of keys is stored for each user, of which only the last one is the current one (the others are revoked).

Using the ChronTree alone, insertion, revocation and the monotonicity proof are O(log n), by exploiting the properties of Merkle trees (we use standard "big O" notation herein to refer to the computation power required to run an algorithm). Insertion may be done by the standard method of extending a Merkle tree. Revocation for a user may be done by insertion of a null key for the user. Monotonicity proof may be done using a technique of proving that one Merkle tree extends another. However, the currency proof is O(n) because one has to show that a given key has not been revoked; this involves enumerating all the transactions that took place after the key was inserted.

Using the LexTree alone, insertion, revocation and the currency proof are O(log n). Insertion and revocation may be done by the standard method of insertion, substitution and deletion of data in a binary search tree, additionally taking care to update the hash values of the Merkle tree. Currency proof may be done by a technique of proving presence of data in a Merkle tree. However, the proof of monotonicity between $db_1$ and $db_2$ is now O(n) because one has to consider each item that has been added between $db_1$ and $db_2$.

However, when ChronTree and LexTree are used together, all required proofs can be carried out in time and space O(log n). Monotonicity proofs are performed using ChronTree, while currency proofs are performed using LexTree.

Insertion and revocation can be done on both trees together, to ensure consistency. Both these operations are O(log n) for both data structures. Computation of insertion and revocation can be performed in parallel.

Because the log of certificates has been stored in two data structures, it is desirable to verify that the two data structures are maintained consistently with each other. This verification requires O(n) time and space. It will in most cases be inefficient for the users' client software to perform the full verification. However, there are some efficiencies that can be achieved.

According to a first alternative, users' client software can perform a randomly chosen partial check on the consistency of the two data structures. The client software randomly chooses and specifies two adjacent branches of ChronTree. Branches of ChronTree terminate in leaves which include data comprising the root hash of the LexTree current at the time the ChronTree leaf was inserted. The client software requires the server to furnish proof that the hash of the LexTree in the leaf of the second specified branch is correctly constructed by taking the LexTree whose hash is in the leaf of the first specified branch and performing the insertion or deletion or other operation which resulted in the insertion of the second leaf into the ChronTree.

According to a second alternative, the consistency verification is not done by users' client software, but rather it is performed in batch mode by public auditors. Anyone can be an auditor. The two alternatives can be also used in combination.

Figure 2:
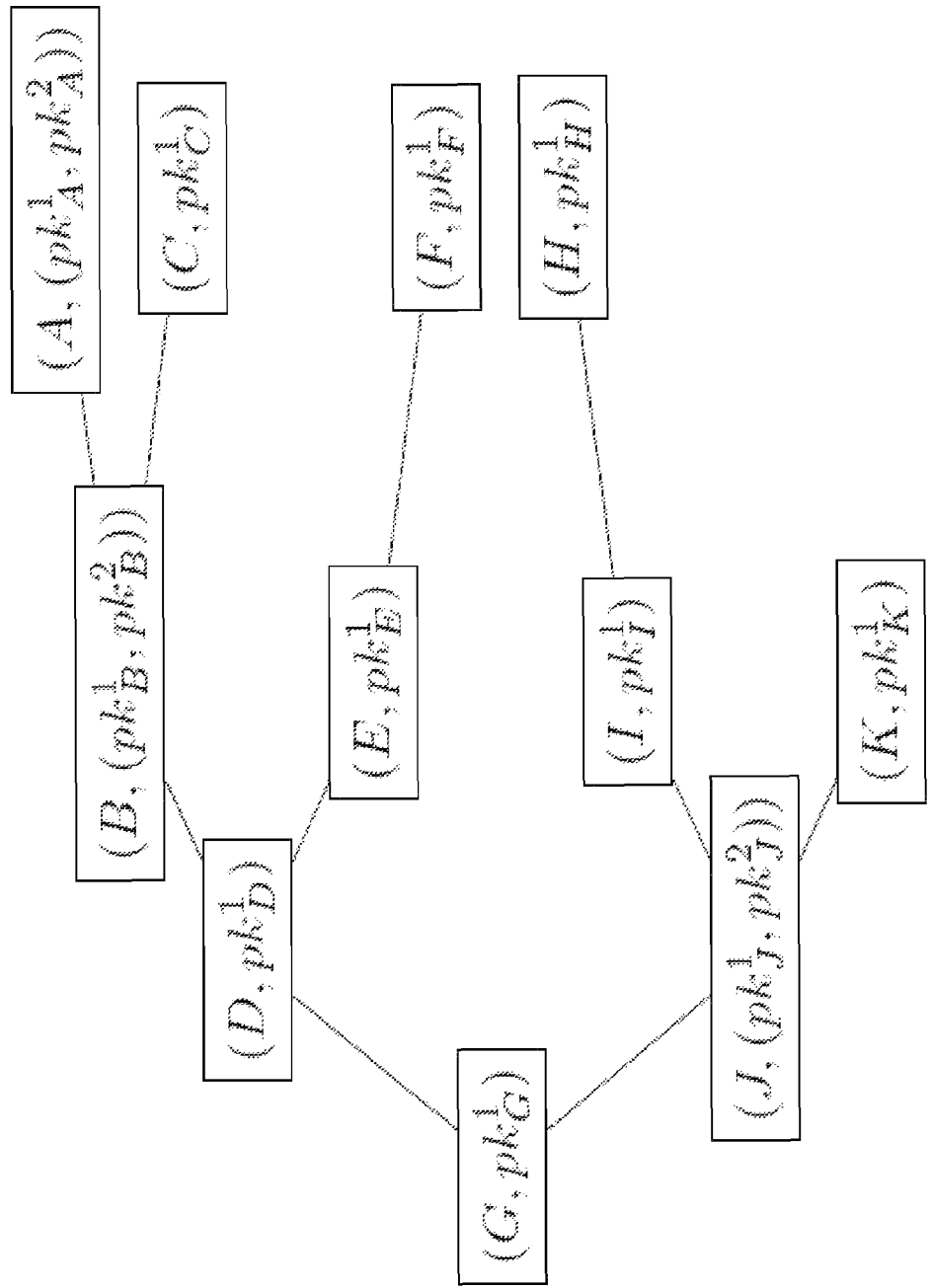
FIG. 2 shows a second data structure forming part of a certificate log database, in accordance with at least one embodiment.

To illustrate these concepts, FIG. 1 shows an example ChronTree and FIG. 2 shows the corresponding LexTree, for an example scenario, in which users with names A, B, C, D, E, F, G, H, I, J, K sign up and some perform key revocations, in the following order:

1. D, B, J sign up;
2. B revokes his key and replaces it with another;
3. G, E, A, I sign up;
4. J and A revoke their keys and replace them with others;
5. K, H, F, C sign up.

Note that the hash values stored at the leaf and non-leaf nodes are not shown in FIG. 1 or 2. The resulting ChronTree is shown in FIG. 1. Certificates are stored at the nodes only. The nodes comprise data that may include the User, the public key $pk_{User}{}^n$ where n is an index of the public key that increments for each entry, and the root tree hash of the LexTree current at the time the node was inserted into ChronTree. The corresponding LexTree is show in FIG. 2. It will be appreciated that the tree has been rotated after user "E" signs up in step (3) above and after K and H sign up in step (5) above, leading to the LexTree of FIG. 2. There will be an element of choice involved in deciding when to rotate a tree and how to rotate it, so the LexTree of FIG. 2 is not a unique representation of the events shown in the illustrative example. However the concept in all cases will be the same—the LexTree will yield the data in lexicographic order of user identifier. Even if the tree rotation is carried out sub-optimally, the currency proof using the LexTree will still be O(log n).

The simple example with a small number of certificates shown in FIGS. 1 and 2 serves to illustrate the concept. Of course, in the real world the requirements will be much different. However the techniques of the disclosure are readily scalable. For instance, suppose the database is required to store keys for one billion ($10^9$) users, who register with the service over a ten year period. We also suppose that, on average, 5% of the keys are revoked each year. This amounts to 270,000 sign-ups per day and 140,000 revocations per day, a total of 410,000 transactions per day.

Insertion and revocation each involve in the order of $\log_2 10^9 \approx 30$ operations on each tree. This will take negligible time.

As for a monotonicity proof; suppose a user has accessed the certificate log and cached $h(db_1)$, and ten days later accesses the certificate log again and obtains $h(db_2)$. The user's software requests a proof that $h(db_1) \subseteq h(db_2)$. This proof may be provided by the CP by comparing $ChronTree_1$ and $ChronTree_2$ corresponding to the two hashes. Because the data structures are Merkle trees, the size of proof that CP provides is independent of the number of transactions that have taken place between $db_1$ and $db_2$ (in our example, it is about 1.4 million transactions). The proof consists of about 30 hash values, together with 30 other values. This is about 2 kB of data.

As for a currency proof; suppose a user wishes to obtain the current key, with proof, for a particular user, joeblogs@example.com. This proof is provided by the CP using LexTree, which is also a Merkle tree. Because this tree is organized in order of user identities, all the information about the user "joeblogs" is in the same place. The CP merely has to prove the presence of the list of keys stored for joeblogs. Exploiting the properties of Merkle trees, the proof again consists of about 30 hashes and 30 other values, again 2 kB of data.

It is important to check the consistency of the database represented by $h(db_2)$. This consistency check can be carried out by an independent auditor. A naïve approach would be to request a full account of all the sign-ups and revocations, and recompute (ChronTree, LexTree). This requires downloading all $10^9$ certificates (which is in the order of $10^9 \times 60$ bytes, or 60 GB).

This can be improved considerably, but it is still O(m) where m is the number of transactions that have taken place since the last audit. This is achieved as follows. Suppose the auditor has previously conducted an audit for $h(db_1)$ done the previous day. The auditor now requests the transactions that have taken place in the last day, i.e., between $h(db_1)$ and $h(db_2)$. As mentioned, there are 410,000 transactions per day. He also requests the necessary parts of the Merkle trees to verify each transaction, one by one. As above, about 2 kB of data is required per transaction. So the auditor needs to download 800 MB per day. If he chooses to audit every hour instead, it is 30 MB of data for each audit.

As mentioned, a randomized partial consistency check can be performed by the user's client software. The coverage of the consistency (as determined by the number of branches checked) check can be greater or smaller according to the available time and bandwidth.

These scenarios can be compared with the use of a single Merkle tree data structure to perform both monotonicity and currency proofs. To illustrate this, we consider the use of a LexTree in isolation. Consider again the user that previously stored $h(db_1)$, and ten days later accesses the certificate log again and obtains $h(db_2)$. The user's software requests a proof that $h(db_1) \subseteq h(db_2)$. The proof is provided by the CP by comparing $LexTree_1$ and $LexTree_2$ for each of the hashes. Because the 4.1 million transactions that took place in the last 10 days are scattered throughout the tree, CP has to provide each transaction in turn along with the data required to verify it. This amount of data is 4.1 million times 2 kB, or about 10 GB. The time taken for a user's software to process this amount of data makes this method impractical. Similarly, a monotonicity proof performed with ChronTree would be prohibitively expensive.

Having efficient currency and monotonicity proofs means users can efficiently verify short proofs that the certificate prover is honest in respect of the data concerned to the user (her own certificate and those of her associates). This means that the method of the disclosure can scale. The ability to scale can be further enhanced by having a third party auditor (rather than the users themselves) perform consistency checks, which have larger proofs, between the two data structures, to prove that a certificate prover is maintaining data structures consistently.

An example application area which benefits from this scalability is electronic messaging services, the most prominent of which is e-mail. Other examples include instant messaging, text messaging (SMS), messages sent via smartphone applications, BlackBerry messaging, Yahoo messaging, Skype, and messaging through social networks such as Facebook and LinkedIn. The present disclosure provides the means to provide a fully usable end-to-end encrypted service without the requirement to trust certificate authorities. Because of this, the whole process of end-to-end encryption for electronic messaging can be made significantly more "user-friendly", and indeed can be as user-friendly as ordinary electronic messaging is today.

An electronic messaging system according to the disclosure is based on public-key encryption, where the sender encrypts messages with the public key of the receiver. To do that, the sender needs to be sure to have an authentic copy of that public key. The receiver decrypts with his private key.

We consider the example of e-mail. The problem of certifying the authenticity of keys is a significant usability problem of public key cryptography, and is also the conceptual point on which S/MIME and PGP differ. In short, S/MIME relies on a hierarchy of trustworthy certificate authorities while PGP relies on a peer-to-peer web of trust of key signatories. Both techniques involve assuming trusted parties that vouch for the authenticity of keys.

However, it is possible to have a single entity, the certificate prover (CP), to vouch for the authenticity of users' keys. To achieve this, the disclosure provides a technique that allows the correctness of the behavior of this service provider to be verified by users' client software. In this way, we do not require the service provider to be trustworthy. That frees users from having to be involved in the evaluation of trust. It allows key management to become fully automatic. E-mail client software verifies the correctness of the service provider; users have to be alerted only if a problem is detected during the verification.

It is also possible to store a user's keys remotely, in other words, in the cloud. A user's keys are held (in encrypted form) on cloud servers and transparently fetched, updated and stored as required, by the user's software. This, together with the maintenance of a certificate log by a CP, means that users do not need to be manually involved in the process of procuring, managing, and storing the relevant keys on their various devices.

To explain further, a user is assumed to have a mail provider (MP) and to have access to certificate logs maintained by a certificate prover (CP). MP can be any existing provider offering IMAP/SMTP, POP/SMTP services, or services according to other protocols.

Users have private and public keys which may be created and managed by the client mail application, and certified by the CP.

The CP maintains a database certifying link between public key and E-mail address (which functions as a user identifier):

db=[cert(alice@ctmail.com, 0x8F42D75E . . . ), . . . ]

This database is monotonic: the CP is allowed only to append to it. The CP is not allowed to modify or delete any part of the database. To demonstrate that it is respecting this monotonicity requirement, CP publishes hashes of its database on demand: $h(db_1), h(db_2), \ldots$ where h is a secure hash function. An example secure hash function is SHA-2, although the present disclosure is not limited to any particular hash function.

Given $h(db_i)$ and $h(db_j)$ with $i<j$, CP can prove that $db_j$ is an extension of $db_i$. We write this as $h(db_i) \subseteq h(db_j)$. Given $db_i$ and user-name u, CP can look up u's public key pk and prove that cert(u, pk) is the most recent entry for u in $db_i$. The format of the proofs is as described above.

Because users' software automatically requests the database hashes and requests and validates these proofs, the CP provides a tamper-evident certification service for the users' public keys. Then, users send e-mail encrypted with each other's public keys.

So, say a user, Alice, wishes to sign up to an encrypted e-mail service. At sign-up time, Alice's client software registers with the CP her existing e-mail address that she has with MP, creates her secret and public keys, and stores them in encrypted form with the CP.

The "client software" referred to here may take various forms. It may comprise a standalone application, or it may comprise an extension or plug-in to an existing mail client program (for example, Outlook or Thunderbird), or it may comprise an appropriately configured web-based application. For simplicity, we refer to Alice's client program as the application.

At sign-up time, the application fetches the current h(db) from CP, and stores it. Alice enters a user-name, say "alice@example.com", and chooses a new password pw. The software chooses an encryption key k. Alternatively, the authentication password pw and key k could be derived from a strong passphrase chosen by the user. The CP then creates an account for Alice, with user name "alice@example.com" and password pw. The application creates public key pair $pk_{Alice}$, $sk_{Alice}$ (where $sk_{Alice}$ is Alice's secret key). The application then stores (Alice, {h(db), $pk_{Alice}$, $sk_{Alice}$, . . . }$_k$) with the CP, where {m1, m2, . . . }$_k$ means the encryption by key k of the messages m1, m2, . . . . The key k may be a symmetric key or a public key.

Then, Alice wants to send an e-mail message to Bob.

Prior to authenticating Alice to the CP, Alice's application fetches the current h(db) from the CP.

Application retrieves its locally stored h(db$_s$) and optionally requests proof that h(db$_s$)⊂ h(db'), and verifies the proof. This proof is optional at this stage. However if it is carried out here, it provides an opportunity for the process to be terminated without having to go through further steps.

Alice requests and verifies proof that cert(Alice, $pk_{Alice}$) is current in db'.

Application authenticates Alice and fetches (Alice, {h(db), $pk_{Alice}$, $sk_{Alice}$, . . . }$_k$) from the CP.

Application requests and verifies proof that h(db)⊂ h(db') and h(db$_s$)⊂ h(db), and replaces its locally stored h(db$_s$) with h(db').

Application finds $pk_{Bob}$ in db' and requests and verifies currency proof.

Application encrypts message for Bob with $pk_{Bob}$ and sends to him.

When Bob receives mail from Alice, a similar process is followed. Bob's application retrieves his versions of h(db$_s$), h(db) and h(db'), and:

checks h(db$_s$)⊂ h(db)⊂ h(db') h(db$_s$).

checks (Bob, $pk_{Bob}$) is correct in db'.

gets $pk_{Alice}$ from db', and requests currency proof.

decrypts Alice's message and checks Alice's signature, if present.

It is possible for sender and recipient to have signed up to different CPs, in which case the CPs can exchange data between each other in order to fulfil the various requests and perform the relevant proofs.

These technical details of how the system functions can be made largely invisible to a user. An example user experience will now be described.

First of all, client software is obtained. As mentioned above, this may be downloaded as a standalone application, or may be an extension to a browser or a mail client. As with any software, users download it from a trusted source.

The software is launched and configured to access an existing mail account. This step is the same as configuring any mail software.

When the e-mail browser is started, it may display one or more graphical elements representing the status of the CP. The graphical elements may for example take the form of "lights", and may for example be of variable colors, with different colors corresponding to different CP statuses, indicating the result of a consistency check of the CP. As an example, the light can be green or red, indicating "healthy" or "problem". It will always be green if the provider behaves properly. Multiple graphical elements may be provided, each of which may correspond to the result of a check made by an auditor; there may be as many elements as auditors.

The user can sign up to whatever auditor he likes, by appropriately configuring the browser. The user can be his own auditor if he likes.

When sending a message, further graphical elements and/or graphical effects may be employed to provide feedback regarding the security status of the intended message. For example, the recipient's e-mail address can be entered (optionally using an auto-complete function). The e-mail address may start to appear in black (or alternative default color) font; and then change to another color once its entry is complete. This other color can represent the encryption status of the message. In one implementation, a "traffic light" system can be used. If the e-mail address turns green, this represents a confirmation that the message will automatically be encrypted so that only the owner of the e-mail address (and anyone else the message is sent to) can read it. However if it turns red, this means that the message will not be encrypted. This may be if the recipient has not signed up to the certificate logging service. Alternatively, the address may turn amber. This intermediate state may occur while the software is checking the proofs. The address will then usually turn green once the checks are successfully completed; or if the CP misbehaves, it may turn red.

The user then composes their message, and then sends it, saves it, and so on, as usual. There is no explicit separate encryption operation, and no requirement to select keys.

It will be appreciated that alternative colors could be used for the e-mail address formatting. Also, it is possible to provide one or more separate graphical elements indicating the encryption status without (or as well as) highlighting the e-mail addresses. These elements may have similar color themes to those of the highlighted e-mail addresses, in other words, may employ a "traffic light" color scheme with red, amber and green; or similar. Interaction with the elements could cause a dialogue to be displayed giving more information about the encryption status.

For receiving messages, users take the usual steps to receive mail. Graphical elements and/or effects can be used to indicate the encryption status of the received mail, in similar fashion to that outlined above for sending e-mail—in other words, the "From" line may be color coded; or one or more separate graphical elements may be provided. Again, there is no need for an explicit decryption operation, and no discussion about keys.

It is possible to provide various further features to an e-mail system. For example, to facilitate cloud-side search, a stored message can be accompanied by a lexicographically ordered list of k-keyed hashes of the words of the message.

Also, to avoid other users and auditors downloading all the e-mail addresses in the proofs, the logs and accompanying proofs can have hashes of addresses instead of real addresses.

The present disclosure invention described in this document solves problems of establishing trustworthiness of a CA. In the case of web browsing, the disclosure provides solutions that enable a public log of certificates to work effectively with certificate revocation. The disclosure also provides solutions that enable mass uptake of end-to-end encrypted e-mail in a form that is as user-friendly as ordinary e-mail is today and which does not require users to trust CAs. It also allows companies of any size to provide end-to-end encrypted e-mail.

The disclosure provides a much improved method to handle currency of certificates (i.e., revocation). Proofs according to the disclosure are of a size of the order of (for example, proportional to) the log of the number of certificates being revoked, which ensures scalability for application areas such as e-mail and web-browser security. The data structures used according to the disclosure allow insertion, revocation, and currency and monotonicity proofs to be performed so that the time and transferred data is of the order O(log n) or better, where n is the number of certificates stored.

Various improvements and modifications can be made to the above without departing from the scope of the disclosure.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for authenticating a digital certificate comprising the steps of:
   providing a database of digital certificates stored within a computer storage media accessible by a computer, wherein each of the digital certificates are stored using both a first data structure in which items are stored in chronological order and a second data structure which is ordered by certificate identifier;
   using the first data structure to establish a proof that a later snapshot of the database is an extension of an earlier snapshot of the database; and
   using the second data structure to establish a proof that a given digital certificate is currently valid; and wherein:
   the first data structure is arranged such that proofs of chronological extension of the data structure can be furnished in a time of the order of the logarithm of its size; and
   the second data structure is arranged such that proofs of a set of keys in the data structure corresponding to a given certificate identifier can be furnished in a time of the order of the logarithm of its size.

2. The method of claim 1, wherein the first and/or second data structures comprise tree data structures.

3. The method of claim 1, wherein the first data structure comprises a Merkle tree.

4. The method of claim 1, wherein, in the second data structure, a list of keys is stored for each certificate, of which only the last one is the current one, the others being revoked.

5. The method of claim 1, wherein the database may be updated by marking a certificate as revoked.

6. The method claim 1, comprising providing to a third party a proof that a later snapshot of the database is an extension of an earlier snapshot of the database; and/or a proof that a given digital certificate is currently valid.

7. The method of claim 1, wherein the step of providing a database of digital certificates is carried out by a certificate prover (CP) who is independent of a party who issues the digital certificates.

8. The method of claim 1, comprising the step of verifying consistency between data stored in the first and second data structures so as to perform a consistency check, and wherein the consistency check is carried out by an auditor who is independent of users whose digital certificates are stored in the database, of the CP and of a party who issues the digital certificates.

9. The method of claim 1, comprising the step of verifying consistency between data stored in the first and second data structures so as to perform a consistency check, by querying a randomly chosen portion or portions of the data structures.

10. The method of claim 9, wherein a result of the consistency check and/or the proof that a later snapshot of the database is an extension of an earlier snapshot of the database and/or the proof that a given digital certificate is currently valid is represented as one or more graphical elements and/or graphical effects which are displayed to a user.

11. The method of claim 10, wherein the graphical elements comprise a series of traffic light icons, which are selectively colored according to the status of the consistency check.

12. The method of claim 10, wherein the graphical effects comprise the selective coloring of an electronic messaging service address according to the status of the one or more of the consistency check, proof that a later snapshot of the database is an extension of an earlier snapshot of the database and proof that a given digital certificate is currently valid.

13. The method of claim 1, wherein the certificate identifier comprises an electronic messaging service address; and the steps of querying the first data structure to establish a proof that a later snapshot of the database is an extension of an earlier snapshot of the database and querying the second data structure to establish a proof that a given digital certificate is currently valid are performed by a message sender to authenticate a digital certificate of a message recipient before sending an electronic message encrypted with the recipient's public key.

14. A system for authenticating a digital certificate comprising:
    a database of digital certificates stored within a computer storage media accessible by a computer, wherein each of the digital certificates are stored using both a first data structure in which items are stored in chronological order and a second data structure which is ordered by certificate identifier; and
    executable functionality that queries the first data structure to establish a proof that a later snapshot of the database is an extension of an earlier snapshot of the database; and that queries the second data structure to establish a proof that a given digital certificate is currently valid; and wherein:
    the first data structure is arranged such that proofs of chronological extension of the data structure can be furnished in a time of the order of the logarithm of its size; and
    the second data structure is arranged such that proofs of a set of keys in the data structure corresponding to a given certificate identifier can be furnished in a time of the order of the logarithm of its size.

15. The system of claim 14, further comprising executable functionality that marks a certificate as revoked.

16. The system of claim 14, wherein the database and executable functionality that queries the database are hosted by a certificate prover (CP); who also provides an interface for third parties to request and receive the proof that a later snapshot of the database is an extension of an earlier snapshot of the database; and the proof that a given digital certificate is currently valid.

17. A computer program product comprising:
a database stored within a computer storage media accessible by a computer, comprising:
   a first data structure in which items are stored in chronological order; and
   a second data structure which is ordered by user identifier; and
executable functionality that queries the first data structure to establish a proof that a later snapshot of the database is an extension of an earlier snapshot of the database; and that queries the second data structure to establish a proof that a given datum is currently valid; and wherein:
the first data structure is arranged such that proofs of chronological extension of the data structure can be furnished in a time of the order of the logarithm of its size; and
the second data structure is arranged such that proofs of a set of keys in the data structure corresponding to a given certificate identifier can be furnished in a time of the order of the logarithm of its size.

\* \* \* \* \*